July 30, 1940. C. J. DALLEY Re. 21,517

NUT LOCK FOR SHEARS AND THE LIKE

Original Filed June 24, 1936

INVENTOR.
Charles J. Dalley,
BY Philip S. McGean.
ATTORNEY.

Reissued July 30, 1940

Re. 21,517

UNITED STATES PATENT OFFICE 21,517

NUT LOCK FOR SHEARS AND THE LIKE

Charles J. Dalley, Maplewood, N. J., assignor to The W. H. Compton Shear Company, Newark, N. J.

Original No. 2,108,654, dated February 15, 1938, Serial No. 86,946, June 24, 1936. Application for reissue November 14, 1939, Serial No. 304,370

1 Claim. (Cl. 151—38)

This invention relates to an improved means for locking a nut on a bolt against rotation under normal operation. The device is adapted for numerous applications but is particularly adapted for holding the nut on the pivotal screw of hinged element, such as scissors and shears.

Figure 1:
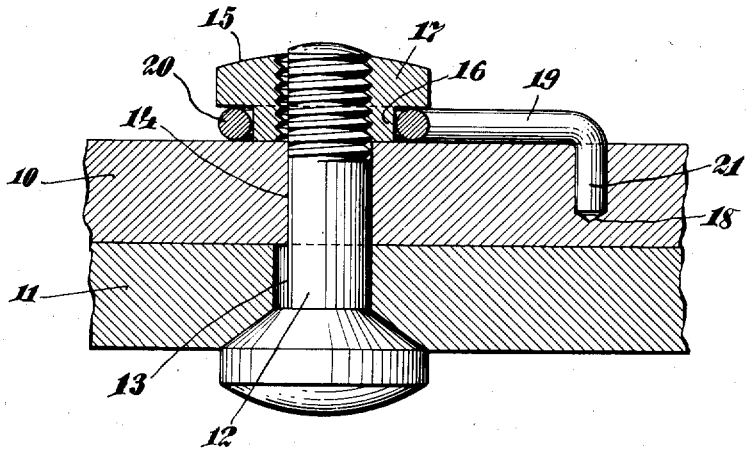
Figure 2:
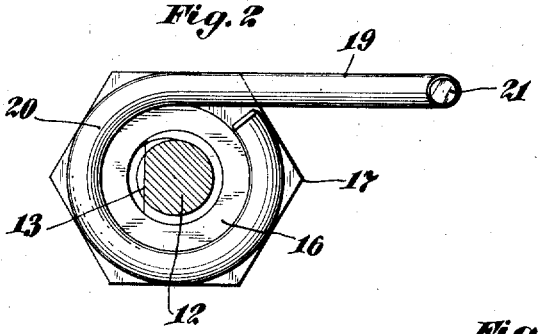
Figure 3:
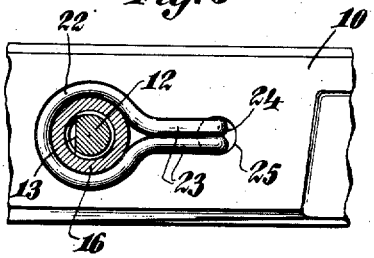
Figure 4:
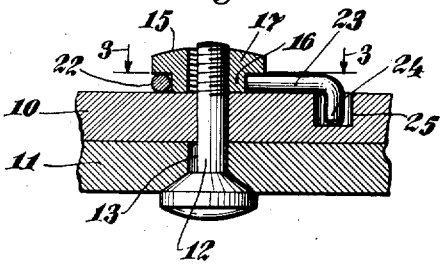

The invention is illustrated as applied to the pivotal screw on a pair of scissors and in the accompanying drawing Figure 1 is a section of the contacting parts of two pivoted blades with the bolt shown in elevation. Figure 2 is a bottom view of nut and the clip that locks the nut, the bolt being shown in section. Figure 3 is a top view of a modified form of lock with the nut in section. Figure 4 is a longitudinal central section through Figure 3.

In the drawing I show a blade 10 and a blade 11 pivotally held together by a bolt 12, the bolt having a flat side 13 and the hole in one blade, such as the blade 10, having a flat side 14 to cause the blade and bolt to swing together.

The nut 15 is screwed on to the threaded end of the bolt and has a circular part 16. The nut shown has a head 17 extending beyond the circular part and having an angular edge for receiving a wrench although this head can be dispensed with. The blade 10 is provided with a recess or hole 18.

A wire clip is used for locking the nut in adjusted position. The clip consists of a single piece of wire 19 formed at one end into a loop 20 and at the other end into a stud 21. The stud 21 fits into the recess 18 and the loop 20 encircles the circular part of the nut to hold it in adjusted positions. The circular part 16 may be provided with a rough exterior face or made irregular in other ways although a circular portion is preferred because of easy manufacture.

When the device is to be used the bolt and blades are assembled. The clip is then placed with the stud 21 in the recess 18 and the loop 20 around the bolt. The nut is then placed on the bolt and screwed down. The circular part 16, which is slightly larger in diameter than the diameter of the inside of the loop 20 engages and spreads the loop. This is easily done in the case of round wire as the first contact of the part 16 with the wire loop is on the rounded part of the wire and acts as a cam in spreading the loop. As the nut is screwed down the tension by the loop increases and the function acts to hold the nut against rotatable movement relative to the bolt and relative to the blade 10. By this device the tension established on a pair of shears is easily regulated and such regulation is maintained.

In Figures 3 and 4 I show a modified form of nut lock. In these views the bolt and nut are the same as in Figures 1 and 2 but I provide a clip with a loop 22 which encircles the nut 15 and has two projecting arms 23 each arm being bent to form a stud 24. The studs are seated in the blade 10 and while separate holes for the studs may be provided, I prefer to provide a single recess 25. The ends of arms 23 are normally apart when released and are squeezed together to place them in the recess 25, thus causing a positive and adequate frictional contact with the nut.

I claim:

In a shears, the combination of a blade receiving a bolt, a bolt, a nut on the bolt, said nut having a circular part on its exterior, and a wire clip having a loop on one end, said loop having a normal inside diameter slightly less than the diameter of the circular part of the nut, the blade having a recess in it, the wire having its other end formed into a stud to enter the recess and act to hold the clip against turning when the nut is screwed on the bolt and the circular part of the nut spreads the loop into gripping relation with the nut, said clip being of round wire so that the rounded part of the wire will act as a cam when engaged by the circular part to spread the loop and said loop being only a single turn and the nut having a head extending beyond said circular part in confining relation over said single turn of round wire and whereby free continuous adjustment of the nut in both directions and locking in all such positions of adjustment is provided.

CHARLES J. DALLEY.